United States Patent [19]

Muneki et al.

[11] Patent Number: 4,675,219

[45] Date of Patent: Jun. 23, 1987

[54] PROCESS FOR DRAWING PLASTIC LAMINATES

[75] Inventors: Yamada Muneki, Fujisawa; Sakamoto Akira, Yokohama, both of Japan

[73] Assignee: Toyo Seikan Kaisha, Ltd., Tokyo, Japan

[21] Appl. No.: 847,109

[22] Filed: Apr. 3, 1986

Related U.S. Application Data

[63] Continuation of Ser. No. 576,893, Feb. 3, 1984, abandoned.

[30] Foreign Application Priority Data

Feb. 8, 1983 [JP] Japan ................................. 58-18042

[51] Int. Cl.$^4$ ........................ B27N 5/02; B32B 27/06
[52] U.S. Cl. ..................................... 428/35; 428/483
[58] Field of Search .................. 264/171, 288.4, 290.2; 428/35, 483

[56] References Cited

U.S. PATENT DOCUMENTS

| | | | |
|---|---|---|---|
| 3,949,114 | 4/1976 | Viola et al. | 428/483 |
| 4,082,854 | 4/1978 | Yamada et al. | 428/475.8 |
| 4,284,671 | 8/1981 | Cancio et al. | 428/290 |
| 4,451,512 | 5/1984 | Yazaki et al. | 428/414 |
| 4,481,238 | 11/1984 | Fagerburg et al. | 528/288 |
| 4,482,587 | 11/1984 | Fagerburg et al. | 528/288 |
| 4,482,588 | 11/1984 | Fagerburg et al. | 528/288 |
| 4,564,541 | 1/1986 | Taira et al. | 428/355 |

*Primary Examiner*—Joseph L. Schofer
*Assistant Examiner*—N. Sarafin
*Attorney, Agent, or Firm*—Sherman and Shalloway

[57] ABSTRACT

Disclosed is a process for drawing plastic laminates, which comprises draw-forming a laminate comprising a layer of a polyester composed essentially of ethylene terephthalate units, a gas barrier layer of an olefin vinyl alcohol copolymer and an adhesive layer interposed therebetween under temperature and draw ratio conditions satisfying a requirement represented by the following formula:

$$X \leq \frac{100 - Y}{(0.112 - 0.000825t)}$$

wherein X stands for the area draw ratio (%) defined by the formula of X=100(tho/th-1) in which tho stands for the thickness of the laminate before draw forming and th stands for the thickness of the laminate after draw forming, Y stands for the vinyl alcohol content (mole %) in the olefin vinyl alcohol copolymer, and t stands for the draw forming temperature (° C.).

10 Claims, 5 Drawing Figures

PROCESS FOR DRAWING PLASTIC LAMINATES

This application is a continuation of application Ser. No. 576,893, filed Feb. 3, 1984, now abandoned.

BACKGROUND OF THE INVENTION

1. Field of the Invention

The present invention relates to a process for drawing plastic laminates. More particularly, the present invention relates to a process for drawing plastic laminates comprising an ethylene terephthalate type polyester layer and a gas barrier layer of an olefin vinyl alcohol copolymer, said two layers being bonded through an adhesive layer. Furthermore, the present invention relates to a draw-formed structure.

2. Description of the Prior Art

Since polyethylene terephthalate (PET) is excellent in the moldability and can be molecularly biaxially oriented, PET is used as a biaxially drawn film, thermoformed cup or biaxially draw-blow-formed bottle excellent in the impact resistance, rigidity, gas barrier property and transparency. However, the gas permeability of this polyester, for example, the oxygen or carbon dioxide gas permeability, cannot be neglected, and in the field of films, a biaxially drawn PET film is laminated with other high barrier film through an adhesive and this laminate is used for the production of a pouch. In the field of thermoformed PET cups, a drawn and oriented cup having a capacity of 200 to 300 milliliters is used for storing beer or carbonated drink, but since the storability is very low, cups of this type are not broadly used. In the field of biaxially draw-blow-formed PET bottles, the shelf life is about 3 months and practically satisfactory because of the relation between the inner volume of the vessel and the surface area of the vessel when the bottle size is large and the capacity is larger than 1 liter. However, in case of a small-size bottle having a capacity smaller than 1 liter, especially smaller than 500 milliliter, the shelf life is about 2 months at longest and the use of this bottle is considerably limited.

An olefin-vinyl alcohol copolymer such as a saponified ethylene-vinyl acetate copolymer is well-known as a heat-moldable resin excellent in the oxygen barrier property, and it also is known that this resin is combined with other resin excellent in the moisture resistance, for example, an olefin resin, and is used for the production of an undrawn or drawn multi-layer plastic vessel.

Proposals have been made as to the production of vessels from laminates of a polyester and an olefin-vinyl alcohol copolymer. It is naturally expected that a laminate of this type will be excellent in the gas barrier property, impact resistance and rigidity, but a laminate of this type, especially a drawn laminate, has not been practically used. One reason is that an excellent adhesive providing a strong interlaminar bonding between the polyester and olefin-vinyl alcohol copolymer even after draw forming has not been found out. Reduction of the interlaminar bonding strength by draw forming cannot be avoided and the most important reason is that means capable of controlling this reduction of the interlaminar bonding strength to a very low level has not been developed.

SUMMARY OF THE INVENTION

We found that when a laminate comprising a polyester layer and an olefin-vinyl alcohol copolymer layer, which are bonded through an interposed adhesive, is drawn under specific conditions described hereinafter, a drawn laminate, that is, a drawn laminate film, sheet, bottle or cup, which is excellent in the combination of the interlaminar peel strength, gas barrier property, shock resistance, rigidity and transparency and is valuable for the production of a sealed vessel can be obtained.

In accordance with the present invention, there is provided a process for drawing plastic laminates, which comprises draw-forming a laminate comprising a layer of a polyester composed essentially of ethylene terephthalate units, a gas barrier layer of an olefin-vinyl alcohol and an adhesive layer interposed therebetween under temperature and draw ratio conditions satisfying a requirement represented by the following formula:

$$X \leq \frac{100 - Y}{(0.112 - 0.000825t)}$$

wherein X stands for the area draw ratio (%) defined by the formula of X=100(tho/th−1) in which tho stands for the thickness of the laminate before draw forming and th stands for the thickness of the laminate after draw forming, Y stands for the vinyl alcohol content (mole %) in the olefin-vinyl alcohol copolymer, and t stands for the draw forming temperature (°C).

From the viewpoint of the gas barrier property of the draw-formed structure, it is important that the olefinvinyl alcohol copolymer should contain at least 40 mole % of the vinyl alcohol units, and from the viewpoint of the adaptability to the draw forming operation and the moisture resistance, it is important that the vinyl alcohol unit content should not be higher than 80 mole %.

In order to impart molecular orientation to the polyester, it is important that the draw forming temperature t should be lower than the crystallization temperature of the polyester, ordinarily lower than 135° C. Though the lower limit of the draw forming temperature is not particularly critical, but it is preferred that the draw forming temperature be higher than 40° C. If the area draw ratio X is at least 100%, advantageous molecular orientation can be imparted to the polyester layer.

In order to perform draw forming without interlaminar peeling, it is important that the adhesive layer should be composed of a thermoplastic resin having a glass transition temperature (Tg) lower than the draw forming temperature t. In order to retain a high bonding strength in the laminate structure after draw forming, it is preferred that the adhesive layer be composed of a copolyester, copolyamide or polyester-amide having a dynamic elasticity modulus lower than those of the polyester layer and the olefin-vinyl alcohol copolymer at the draw forming temperature, or a blend thereof.

BRIEF DESCRIPTION OF THE DRAWINGS

FIG. 1-B is a diagram showing an example of the layer structure of a laminate which has been subjected to draw forming of the present invention. FIG. 1-C is a diagram showing the layer structure of an adhesive layer-free laminate which has been subjected to the drawing test for obtaining the formula (6) of the present invention.

DETAILED DESCRIPTION OF THE PREFERRED EMBODIMENTS

Figure 1A:
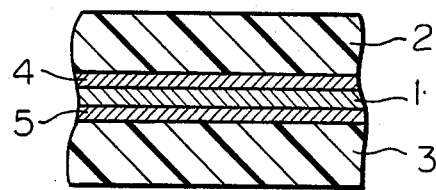
FIG. 1-A is a diagram showing an example of the layer structure of a laminate before draw forming of the present invention.
Figure 1B:
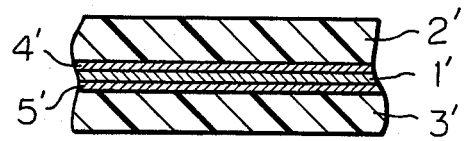
Figure 1C:
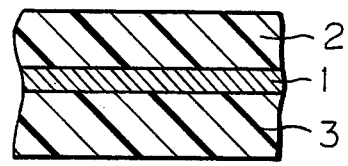

An embodiment of the laminate to be drawn in the present invention is illustrated in FIG. 1-A. The laminate of this embodiment before draw forming comprises an intermediate gas barrier layer 1 of an ethylene-vinyl alcohol copolymer and inner and outer surface layers 2 and 3 composed of an undrawn polyester having ethylene terephthalate units as main units, and adhesive layers 4 and 5 described in detail hereinafter are interposed between the gas barrier layer 1 and the polyester layers 2 and 3, respectively. FIG. 1-B shows a film obtained by drawing the laminate shown in FIG. 1-A according to the process of the present invention, and this film comprises a gas barrier layer 1' containing an ethylene-vinyl alcohol copolymer, inner and outer surface layers 2' and 3' composed of a drawn polyester and adhesive layers 4' and 5'.

Figure 2:
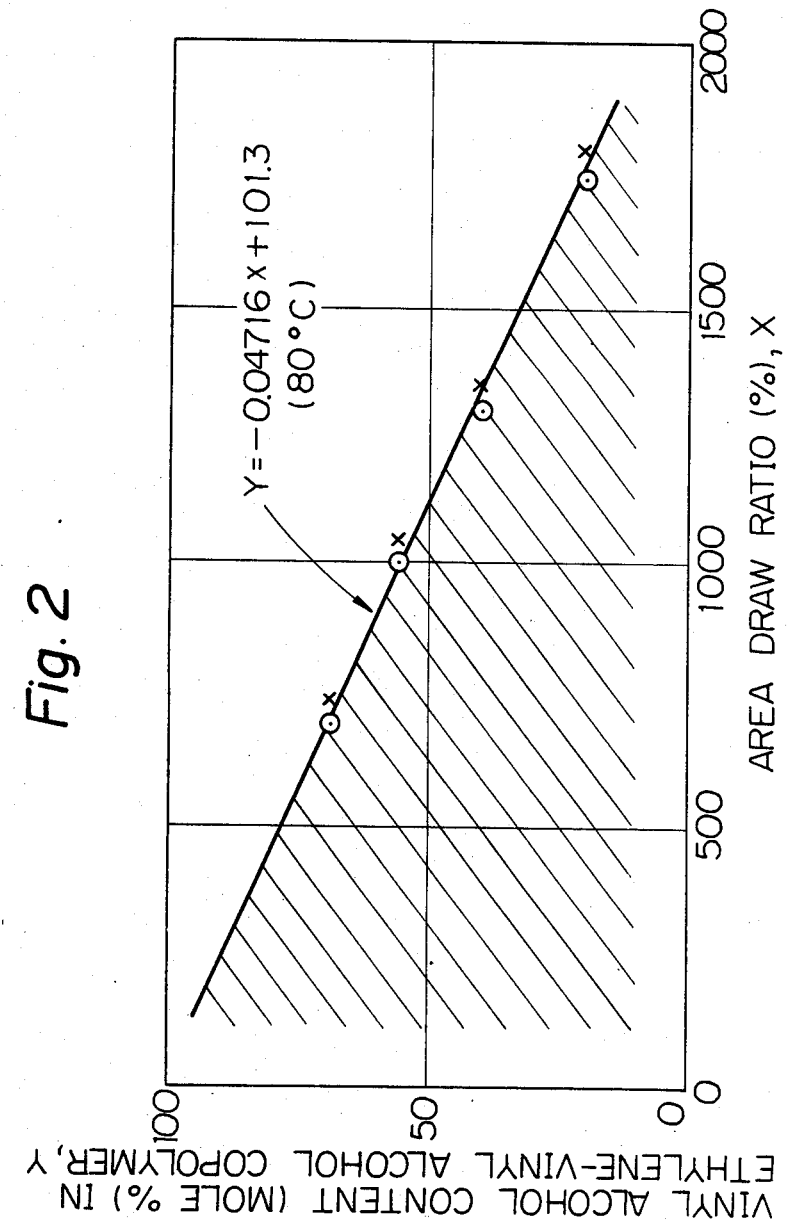
FIG. 2 is a diagram illustrating the relation between the vinyl alcohol content and the maximum draw ratio, which was observed when a laminate having the layer structure shown in FIG. 1-C was subjected to the drawing test at 80° C.

FIG. 2 shows the results of the drawing test conducted at 80° C. by using a laminate having no adhesive layer interposed between the polyester layer and ethylene-vinyl alcohol copolymer, which is shown in FIG. 1-C, while changing the viny alcohol content in the ethylenevinyl alcohol copolymer. The abscissa denotes the area draw ratio X, and this area draw ratio X is defined by the following formula:

$$X = \left( \frac{tho}{th} - 1 \right) \times 100 \quad (1)$$

wherein tho stands for the thickness of the laminate before drawing and th stands for the thickness of the laminate after drawing.

The area draw ratio can also be defined by the formula of $(S/So-1) \times 100$ in which So stands for the surface area of the product before drawing and S stands for the surface area of the product after drawing.

The ordinate in FIG. 2 denotes the vinyl alcohol content in the ethylene-vinyl alcohol copolymer. The laminate shown in FIG. 1-C comprises an intermediate barrier layer of an ethylene-vinyl alcohol copolymer differing in the vinyl alcohol content and inner and outer surface layers of polyethylene terephthalate which is substantially amorphous (having a density lower than 1.340 g/cm³ as measured at 20°), no adhesive layer being interposed between the barrier layer and the inner or outer surface layer. Laminates as shown in FIG. 1-C were biaxially drawn (the drawing speed was 50 mm/min) at 80° C. by a biaxially drawing device. In FIG. 2, marks "○" indicate the relation between the vinyl alcohol content and the maximum area draw ratio at which drawing was possible without breakage, uneven drawing, cracking or formation of pinholes in the ethylene-vinyl alcohol copolymer as the barrier layer, and marks "X" indicate the relation between the viny alcohol content and the minimum area draw ratio at which breakage or formation of pinholes was caused in the ethylene-vinyl alcohol copolymer as the barrier layer.

In FIG. 2, if a line passing through the four points of the relation between the vinyl alcohol content and the maximum area draw ratio is determined according to the least-squares method, it is seen that the line is expressed by the following formula:

$$Y = -0.0472X - 101 \quad (2)$$

wherein Y stands for the vinyl alcohol content (mole %) in the ethylene-vinyl alcohol copolymer and X stands for the above-mentioned area draw ratio (%).

The formula (2) is one determined when the drawing temperature was 80° C. We found that a linear relation represented by the following formula:

$$Y = aX + b \quad (3)$$

wherein X and Y are as defined above, and a and b are constants determined by the drawing temperature, is established at other drawing temperatures. Values of a and b at various temperatures, obtained by experiments, are shown in Table 1.

TABLE 1

| Temperature Dependency of Values a and b | | |
|---|---|---|
| Drawing Temperature (°C.) | a | b |
| 50 | −0.0707 | 101 |
| 70 | −0.0525 | 98.7 |
| 80 | −0.0472 | 101 |
| 90 | −0.0387 | 101 |
| 100 | −0.0290 | 99.0 |
| 110 | −0.0206 | 99.7 |

Figure 3:
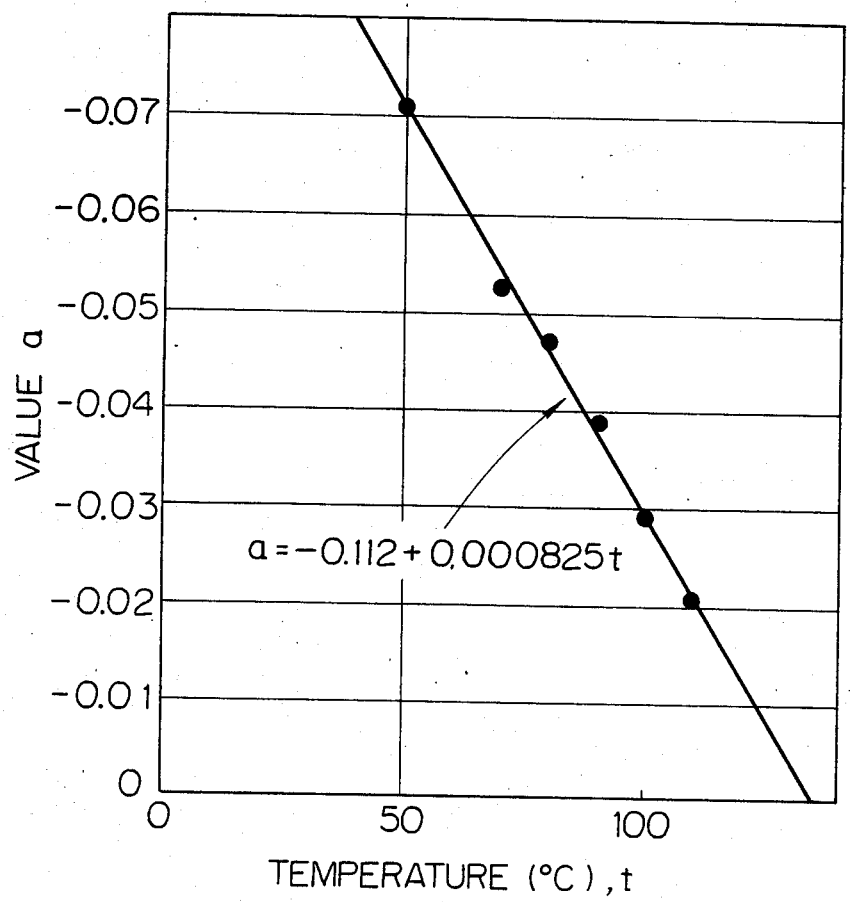
FIG. 3 is a diagram illustrating the relation between the gradient of the line shown in FIG. 2 and the drawing temperature, which was determined by measuring said gradient at respective temperatures.

In FIG. 3, the values a shown in Table 1 are plotted on the ordinate, and the drawing temperatures are plotted on the abscissa. It is seen that a very good linear relation is established between the drawing temperature and the value a. The relation between the value a and the drawing temperature t, determined according to the least-squares method, is represented by the following formula:

$$a = -0.112 + 0.000825t \quad (4)$$

wherein a and t are as defined above.

The values b shown in Table 1 have no substantial temperature dependency, and it may be considered that when the vinyl alcohol content is 100 mole %, the possible draw ratio is 0. Accordingly, the formula (3) can be expressed as follows:

$$Y = 100 - (0.112 - 0.000825t)X \quad (5)$$

wherein X, Y and t are as defined above.

Namely, it was found that in a region defined by the following formula:

$$Y \leq 100 - (0.112 - 0.000825t)X \quad (6)$$

that is, $$X \leq \frac{100 - Y}{(0.112 - 0.000825t)} \quad (7)$$

drawing of a laminate of a polyester layer and a layer of an olefin-vinyl alcohol copolymer is possible (in FIG. 2, this region observed at a temperature (t) of 80° C. is heated).

It also was found that the regions where ethylenevinyl alcohol copolymers can be drawn are much broader than the regions where ethylene-vinyl alcohol copolymers not sandwiched with polyesters, which differ in the vinyl alcohol content, can be drawn, and the drawability of ethylene-vinyl alcohol copolymers can be highly improved by laminating them with polyester resins.

When laminates comprising a polyethylene terephthalate layer, an ethylene-vinyl alcohol copolymer layer and an interposed intermediate adhesive layer, as shown in FIG. 1-A, were subjected to the drawing test in the same manner as described above, the drawing-possible region is further broadened. To our great surprise, it was found that under drawing conditions defined by the above-mentioned formula (7), reduction of the interlaminar bonding strength between the polyethylene terephthalate layer and the adhesive layer and the interlaminar bonding strength between the adhesive layer and the ethylene-vinyl alcohol copolymer layer by the draw forming operation can be controlled to a very small level, and that if the drawing conditions are outside the range defined by the above formula (7), the degree of reduction of the interlaminar bonding strength by the draw forming operation is increased and the drawn laminate has no practical utility. By the term "laminate" used herein is meant a laminate comprising a layer of a polyester composed mainly of polyethylene terephthalate and a gas barrier layer of an olefin-vinyl alcohol copolymer, said two layers being bonded through an adhesive layer.

The polyester may be polyethylene terephthalate alone or it may be a blend composed mainly of polyethylene terephthalate or a copolyester composed mainly of ethylene terephthalate units, so far as the processability is not impaired. As the comonomer, there can be mentioned dicarboxylic acids such as isophthalic acid, p-$\mu$-hydroxyethoxybenzoic acid, naphthalene-2,6-dicarboxylic acid, diphenoxyethane-4,4'-dicarboxylic acid, 5-sodium-sulfoisophthalic acid, adipic acid, sebacic acid and alkyl ester derivatives thereof, and glycols such as propylene glycol, 1,4-butane-diol, neopentyl glycol, 1,6-hexylene glycol, cyclohexane dimethanol and an ethylene oxide adduct of bisphenol A. The polyester may further comprise a colorant such as a pigment or a dye or an additive such as an ultraviolet absorber or an antistatic agent. Polyethylene terephthalate comprising at least 95 mole % of ethylene terephthalate units is most preferred, and from the viewpoint of the mechanical properties, it is preferred that the polyester should have an intrinsic viscosity of at least 0.05 l/g, especially at least 0.06 l/g, as measured at 30° C. in a mixed solvent comprising phenol and tetrachloroethane at a weight ratio of 50/50.

A copolymer comprising units of an olefin such as ethylene or propylene and vinyl alcohol units obtained by saponifying units of a vinyl ester such as vinyl acetate is used as the olefin-vinyl alcohol copolymer. From the viewpoint of the gas barrier property and moisture resistance, it is important that this olefinvinyl alcohol copolymer should contain 40 to 80 mole %, especially 50 to 75 mole %, of vinyl alcohol units, and the content of the residual vinyl ester units should be lower than 4 mole %, especially lower than 1 mole %. The molecular weight of the olefin-vinyl alcohol copolymer is not particularly critical and it is sufficient if the copolymer has a film-forming molecular weight. For example, in case of an ethylenevinyl alcohol copolymer, it is preferred that the intrinsic viscosity be in the range of from 0.07 to 0.17 l/g as measured at 30° C. in a mixed solvent comprising 85% by weight of phenol and 15% by weight of water.

Adhesives satisfying the above-mentioned requirement can be used for the adhesive layer to be interposed between the polyester layer and the olefin-vinyl alcohol copolymer. Examples are as follows.

(1) Thermoplastic resins containing ester groups and amide groups, such as a polyester-amide copolymer and a mixture of a polyester and a polyamide.

(2) Ethylene terephthalate/isophthalate copolymers, butylene terephthalate/isophthalate copolymers and mixtures thereof.

(3) Copolyesters containing an ether group-containing glycol as a part of the glycol component.

(4) Thermoplastic resins modified with acids or acid anhydrides such as maleic acid, maleic anhydride, acrylic acid, methacrylic acid, citraconic anhydride and itaconic anhydride.

(5) Hot melt adhesives comprising a base resin such as polyethylene or an ethylene-vinyl acetate copolymer and a tackifier such as styrene-butadiene resin, a petroleum resin, rosin or modified rosin.

These adhesives may be used singly, or mixtures of two or more of these adhesives or mixtures of these adhesives with other adhesives may be used.

The layer structure of the laminate used in the present invention is not particularly critical, so far as the adhesive (AD) is interposed between the polyester layer (PT) and the olefin-vinyl alcohol copolymer (EV). For example, there can be adopted a symmetric five-layer structure of PT/AD/EV/AD/PT shown in the drawings but also a three-layer structure of PT/AD/EV and a four-layer structure of PT/AD/EV/AD.

In the case where the yield of the product is very low in the draw forming process of the present invention as in formation of a cup or the like from a sheet described hereinafter and scrap return is carried out, a scrap layer (SR) should be formed. In this case, for example, there may optionally be adopted a seven-layer structure of PT/SR/PT/AD/EV/AD/PT, a nine-layer structure of PT/SR/PT/AD/EV/AD/PT/SR/PT, a seven-layer structure of PT/SR/AD/EV/AD/SR/PT and a five-layer structure of PT/AD/EV/AD/SR.

The thickness of the polyester layer (PT), the adhesive layer (AD) and the olefin-vinyl alcohol copolymer layer (EV) can optionally be changed, but in order to obtain a good combination of the gas barrier property, impact resistance and the interlaminar peel strength, it is ordinarily preferred that the polyester layer be thickest, the adhesive layer be as thin as possible and the thickness of the olefin-vinyl alcohol copolymer layer be appropriately determined according to the required gas barrier property. More specifically, it is preferred that the PT/EV thickness ratio be in the range of from 200/1 to 5/1 and the EV/AD thickness ratio be in the range of from 10/1 to $\frac{1}{2}$. Moreover, it is preferred that the total thickness of the laminate obtained according to the process of the present invention be 50 to 3000 microns, especially 100 to 2000 microns.

The laminate to be subjected to draw forming in the process of the present invention is preferably prepared by simultaneous extrusion (co-extrusion) of multiple layers. Since good mingling of both the resin is attained in the bonding interface between the two layers by this simultaneous extrusion, a laminate structure having an especially excellent bonding strength can be obtained. In this simultaneous extrusion, the above-mentioned adhesives (1), (2), (3) and (4) can be used. At the simultaneous extrusion step, the polyester layer, olefin-vinyl alcohol copolymer layer and adhesive layer, and if necessary, the scrap layer, are melted and kneaded in extruders for the respective layers, and the melts are combined in an adapter (feed block) or a die and they are extruded so that the adhesive layer is present between the polyester layer and the olefin-vinyl alcohol copolymer layer to form a multi-layer film, a multi-layer sheet, a pipe for a bottle or a preform (preformed article) for a bottle. Incidentally, the preform for a bottle is obtained by preliminary blow forming of the co-extruded melted pipe in a mold or by cooling a pipe formed by co-extrusion, cutting the pipe into a certain length, heating the top and bottom ends of the pipe and forming the mouth and bottom by compression molding.

Formation of the laminate can also be accomplished by so-called sandwich lamination or extrusion coating. For example, an adhesive is coated or extruded in the form of a thin film between a preformed polyethylene terephthalate film and an olefin-vinyl alcohol copolymer film and, if necessary, the assembly is compressed under heating.

According to another method, an olefin-vinyl alcohol copolymer as an intermediate layer and an adhesive as outer and inner layers are simultaneously extruded between two polyester films, and the co-extruded layers are sandwiched with the polyester films and compressed to obtain a laminate structure. There can also be adopted a method in which an adhesive and an olefin-vinyl alcohol copolymer are extrusion-coated in succession on the surface of a polyester film, and a method in which three kinds of preformed films are compressed or rolled under heating in the above-mentioned lamination order.

For formation of a multi-layer parison, there may be adopted a method in which are adhesive and an olefin-vinyl alcohol copolymer are injected in succession on the inner or outer surface of a bottomed parison composed of polyethylene terephthalate to obtain a parison having a multi-layer structure.

Draw forming of the present invention can be performed according to known draw forming procedures except that the laminate is drawn at a temperature t lower than the crystallization temperature of the polyester in the laminate, which satisfies the requirement defined by the following formula:

$$X \leq \frac{100 - Y}{(0.112 - 0.000825t)}$$

wherein X, Y and t are as defined above.

For example, the following drawing methods can be adopted.

(1) A multi-layer film or multi-layer sheet is drawn monoaxially or biaxially by a tenter, a roll or the like to form a drawn multi-layer film or multi-layer sheet.

(2) A multi-layer film or multi-layer sheet is rolled in the cold or warm state by using a roll to form a rolled multi-layer film or multi-layer sheet.

(3) A multi-layer tray-shaped or cup-shaped vessel is formed from a multi-layer film or multi-layer sheet by vacuum forming, air pressure forming, vacuum-air pressure forming, plug assist air pressure forming, plug assist vacuum-air pressure forming, draw forming, press forming, compression forming or stamping forming.

(4) A multi-layer bottle-shaped or cup-shaped vessel is formed from a multi-layer parison or multi-layer preform by draw-blow forming.

The mode of drawing is not particularly critical, and any of free monoaxial drawing, constrained monoaxial drawing, simultaneous biaxial drawing and sequential biaxial drawing can be adopted. The drawing (processing) speed is not particularly critical, and a strain rate of 1 to 10,000%/sec can be adopted.

In accordance with the present invention, there also is provided a draw-formed plastic laminate structure obtained by draw-forming a laminate comprising a polyester layer composed essentially of ethylene terephthalate units, a gas barrier layer of an olefin-vinyl alcohol copolymer having a vinyl alcohol content of 40 to 80 mole % and an adhesive layer interposed between said two layers, wherein the polyester layer is molecularly oriented in at least one direction so that the density is at least 1.35 g/cc as measured at 20° C., the olefin-vinyl vinyl alcohol copolymer layer is molecularly oriented in at least one direction to such an extent as recognizable by the birefringence method and the adhesive layer is composed of a copolyester, copolyamide or polyester-amide having a glass transition temperature (Tg) lower than the crystallization temperature of the polyester layer and a dynamic elasticity modulus lower than those of the polyester layer and the olefin-vinyl alcohol copolymer, or a blend thereof.

More specifically, referring to FIG. 1-B showing the section of the draw-formed laminate structure, in order to attain satisfactory impact resistance, rigidity and transparency, polyester layers 2' and 3' are molecularly oriented in at least one direction so that the density is at least 1.35 g/cc as measured at 20° C. By the molecular orientation of the polyester layer, the gas barrier property is prominently improved and the water vapor permeation coefficient is reduced, with the result that the tendency of increase of the oxygen permeation coefficient with elevation of the humidity in an olefin-vinyl alcohol copolymer layer 1' can be prevented effectively. Furthermore, if the drawing conditions of the present invention are adopted, not only the polyester layer but also the olefin-vinyl alcohol layer 1' is molecularly oriented in at least one direction, and by this molecular orientation, the humidity dependency of the oxygen permeation coefficient is reduced and an excellent oxygen barrier property can be maintained even under high humidity conditions. The degree of the molecular orientation of the olefin-vinyl alcohol copolymer can be evaluated by the birefringence method.

In the present invention, by the term "molecular orientation recognizable by the birefringence method", it is meant that among three-dimensional orientation coefficients determined by the birefringence method ($\cos^2\phi x$, $\cos^2\phi y$ and $\cos^2\phi z$; x and y represent two directions intersecting at right angles in the plane of ethylene-vinyl alcohol copolymer layer and at least one of x and y represents the drawing direction, and z represents the thickness direction of the ethylene-vinyl alcohol copolymer layer), at least one of $\cos^2\phi x$ and $\cos^2\phi y$ has a value of at least 0.36. Incidentally, the three-dimensional coefficients are determined on the assumption that the mean refractive index of the ethylene-vinyl alcohol copolymer used is 1.5 and the following relation is established between the intrinsic birefringence (IB) and the vinyl alcohol content (Y, mole %):

$$IB = 0.0005Y + 0.00044(100 - Y) \tag{8}$$

When the above-mentioned method (3) is adopted, the molecular orientation of the polyester layer and the olefin-vinyl alcohol copolymer layer is caused preferentially in the axial direction of the vessel, and if the method (4) is adopted, the biaxially molecular orientation is caused in the axial and circumferential directions of the vessel.

The draw-formed laminate structure obtained according to the drawing process of the present invention is further characterized in that the dynamic elasticity modulus (Kg/cm$^2$) of the adhesive layers 4' and 5' is lower than those of the polyester layer and the olefin-vinyl alcohol copolymer layer. By controlling the elasticity modulus of the adhesive layer to a low level, because of the presence of the soft adhesive layer having a relatively low elasticity modulus, which is interposed between hard drawn polyester and ethylene-vinyl alcohol copolymer layers having a relatively high elasticity modulus, the difference of the stress produced between the polyester layer and the ethylene-vinyl alcohol copolymer layer by an external force or external strain is moderated and the interlaminar peel strength of the draw-formed laminate is maintained at a high level not only just after draw forming but also after the lapse of a long time.

The dynamic elasticity modulus referred to herein is determined according to the method in which an oscillating (periodical) strain is given to a sample, as disclosed in, for example, "Viscoelastic Properties of Polymers" compiled by J. D. Ferry and published in 1961 by Wiley, New York. The dynamic elasticity modulus referred to herein is one determined at an oscillating frequency of 110 cycles per second.

The present invention will now be described in detail with reference to the following examples that by no means limit the scope of the invention.

thalate/isophthalate copolyester (PET/I) having an intrinsic viscosity of 0.088 l/g as measured at 30° C. in the same mixed solvent as described above with respect to PET and an ethylene isophthalate content of 15 mole % and a polybutylene terephthalate/isophthalate copolyester (PBT/I) having an intrinsic viscosity of 0.092 l/g and a butylene isophthalate content of 35 mole % at a weight ratio of 75/25 was used for the adhesive layer. An extruder provided with a screw having a diameter of 65 mm and an effective length of 1690 mm was used for extrusion of the polyester layer, an extruder provided with a screw having a diameter of 38 mm and an effective length of 950 mm was used for extrusion of the gas barrier layer, and an extruder provided with a screw having a diameter of 30 mm and an effective length of 750 mm was used for extrusion of the adhesive layer. By using these extruders, a three-resin 5-layer feed block, a T-die and a three-roll sheet take-up device, a symmetric three-resin five-layer laminate sheet having a total thickness of 0.8 mm and a width of 400 mm, in which PET, AD and EV-1 were laminated as shown in FIG. 1-A at a PET/AD/EV-1 weight ratio of 90/4/6, was prepared. Incidentally, the density of the PET layer of the obtained laminate sheet was 1.336 g/cm$^3$ as determined at 20° C. The laminate sheet was drawn at draw ratios shown in Table 2 by using a biaxially drawing device (supplied by Iwamoto Seisakusho K.K.), and the drawn state of the ethylene-vinyl alcohol copolymer layer as the gas barrier layer, the bonding strength between the gas barrier layer and the adhesive layer, the bonding strength between the adhesive layer and the polyester layer and the transparency (haze, %) of the drawn sheets were evaluated. The obtained results are shown in Table 2.

TABLE 2

| Sample | Drawing Temperature (°C.) | Draw Ratio** | Breakage of Ethylene-Vinyl Alcohol Copolymer | Interlaminar Adhesion Strength (g/10 mm width; T-peel)*** | | Haze****(%) | Requirement of Formula (7) |
| --- | --- | --- | --- | --- | --- | --- | --- |
| | | | | barrier layer/ adhesive layer | adhesive layer/ polyester layer | | |
| A* | — | — | — | peeling impossible | peeling impossible | 3.9 | — |
| B-1 | 50 | 430 | not observed | 830 | 982 | 5.2 | satisfied |
| B-2 | 50 | 450 | not observed | 85 | 736 | 7.8 | not satisfied |
| B-3 | 50 | 500 | observed | 63 | 96 | 20.2 | not satisfied |
| C-1 | 80 | 670 | not observed | 1250 | 1830 | 4.2 | satisfied |
| C-2 | 80 | 700 | not observed | 110 | 926 | 4.6 | not satisfied |
| C-3 | 80 | 750 | observed | 93 | 102 | 9.8 | not satisfied |
| D-1 | 90 | 820 | not observed | 1360 | 1890 | 3.9 | satisfied |
| D-2 | 90 | 840 | not observed | 123 | 950 | 4.3 | not satisfied |
| D-3 | 90 | 900 | observed | 92 | 118 | 8.9 | not satisfied |
| E-1 | 100 | 1050 | not observed | 1420 | 1910 | 3.7 | satisfied |
| E-2 | 100 | 1100 | not observed | 118 | 983 | 4.2 | not satisfied |
| E-3 | 100 | 1200 | observed | 98 | 121 | 9.2 | not satisfied |

Note
*undrawn sheet.
**area draw ratio defined in the instant specification.
***peeling speed was 100 mm/min.
****measured according to the method of JIS K-6714.

EXAMPLE 1

Polyethylene terephthalate (PET) having an intrinsic viscosity of 0.086 l/g as measured at 30° C. in a mixed solvent comprising phenol and tetrachloroethane at a weight ratio of 50/50 was used for the polyester layer, an ethylene-vinyl alcohol copolymer (EV-1) having a vinyl alcohol content of 69 mole %, a residual vinyl acetate content of 0.4 mole % and an intrinsic viscosity of 0.12 l/g as measured at 30° C. in a mixed solvent comprising phenol and water at a weight ratio of 85/15 was used for the gas barrier layer, and a copolyester mixture (AD) comprising a polyethylene tereph-

EXAMPLE 2

The same materials as used in Examle 1 were used for the polyester layer and adhesive layer and two kinds of ethylene-vinyl alcohol copolymers, EV-2 having a vinyl alcohol content of 56 mole %, a residual vinyl acetate content of 0.6 mole % and an intrinsic viscosity of 0.09 l/g and EV-3 having a vinyl alcohol content of 40 mole %, a residual vinyl acetate content of 1.2 mole % and an intrinsic viscosity of 0.098 l/g, were used for the gas barrier layer. By using these materials, laminate sheets having the same thickness and layer structure as described in Example 1 were prepared in the same manner as described in Example 1.

The obtained sheets were subjected to the drawing test in the same manner as described in Example 1. The obtained results are shown in Table 3.

TABLE 3

| Sample | Gas Barrier Layer | Drawing Temperature (°C.) | Draw Ratio**(%) | Breakage of Gas Barrier Layer |
| --- | --- | --- | --- | --- |
| F* | EV-2 | — | — | — |
| G-1 | EV-2 | 100 | 1450 | not observed |
| G-2 | EV-2 | 100 | 1500 | not observed |
| G-3 | EV-2 | 100 | 1600 | observed |
| H* | EV-3 | — | — | — |
| I-1 | EV-3 | 80 | 940 | not observed |
| I-2 | EV-3 | 80 | 1020 | not observed |
| I-3 | EV-3 | 80 | 1500 | observed |

| | Interlaminar Adhesion Strength*** (g/10 mm width; T-peel) | | |
| --- | --- | --- | --- |
| Sample | barrier layer/ adhesive layer | adhesive layer/ polyester layer | Requirement of Formula (7) |
| F* | peeling impossible | peeling impossible | — |
| G-1 | 1420 | 1850 | satisfied |
| G-2 | 146 | 936 | not satisfied |
| G-3 | 75 | 186 | not satisfied |
| H* | peeling impossible | peeling impossible | — |
| I-1 | 1380 | 1690 | satisfied |
| I-2 | 125 | 838 | not satisfied |
| I-3 | 93 | 215 | not satisfied |

*undrawn sheet.
**area draw ratio defined in the instant specification.
***peeling speed was 100 mm/min.

EXAMPLE 3

A three-resin five-layer laminate sheet having the same layer structure as described in Example 1 was prepared by using the same materials as used in Example 1 in the same manner as described in Example 1 except that the total thickness was changed to 2.1 mm. Incidentally, the density of the polyethylene terephthalate layer was 1.335 to 1.338 g/cm$^3$ as measured at 20° C.

The obtained sheet was heated at 80° C. by an infrared ray heater (the temperature of the central portion of the sheet was about 78° C. and the temperature of the outer surface portion was about 82° C.) and the heated sheet was formed into a cup having a mouth diameter (inner diameter) of 60 mm, a bottom diameter (outer diameter) of 40 mm, a height of 90 mm, a flange width of 4 mm and a flange thickness of 0.3 mm according to the known plug assist air pressure-vacuum forming method. Incidentally, a Teflon-coated plug was used and the temperature adjustment was not carried out. The mold temperature was controlled to about 40° to about 50° C. The flange portion was caused to flow mainly in the outward direction by a pressing pad (the temperature was adjusted to about 60° C.) and after formation of the cup, the flange portion was finished so that the flange width was 4 mm.

By adopting different speeds for bringing down the plug at the cup-forming step, a cup (CP-1) having a mean bottom thickness of 0.6 mm and a mean barrel thickness of 0.358 mm (largest thickness of 0.402 mm and a smallest thickness of 0.303 mm) and a cup (CP-2) having a mean bottom thickness of 1.8 mm and a mean barrel thickness of 0.253 mm (largest thickness of 0.304 mm and smallest thickness of 0.198 mm) were prepared.

In the cup (CP-1) having a mean barrel thickness of 0.358 mm, the mean area draw ratio of the barrel was 487% and the requirement of the formula (7) was satisfied, but in the cup (CP-2) having a mean barrel thickness of 0.253 mm, the mean area draw ratio was 730% and the requirement of the formula (7) was not satisfied.

Circular samples having a diameter of 70 mm were cut out from the barrels of the two cups CP-1 and CP-2, and the oxygen gas permeability was measured by using a gas permeation tester at a temperature of 30° C. and a relative humidity of 0% on the high pressure side. Furthermore, a rectangular sample having a width of 10 mm and a length of 70 mm was cut out from the barrel of each of the cups CP-1 and CP-2 along the height direction of the cup, and the adhesion strength between the gas barrier layer and the adhesive layer was determined in the same manner as described in Examples 1 and 2. The obtained results are shown in Table 4.

As is apparent from the results shown in Table 4, the ethylene-vinyl alcohol copolymer made no contribution to improvement of the oxygen barrier property in the cup CP-2. The reason is considered to be that pinholes and micro-breakages were present in the ethylene-vinyl alcohol copolymer layer in the cup CP-2.

TABLE 4

| Cup | Oxygen Permeability* of Barrel (cc/m$^2$ · day · atom, 30° C.) | Adhesion Strength** between Gas Barrier Layer and Adhesive Layer (g/10 mm width) |
| --- | --- | --- |
| CP-1 | 1.8 | 830–1210 |
| CP-2 | 15 | 76–315 |

Note
*mean value of three samples.
**maximum and minimum values among 10 samples are shown; since the interface between the gas barrier layer and the adhesive layer was present on either the inner surface side or outer surface side of the vessel, the mean value of the value on the inner surface side and the value on the outer surface side was calculated with respect to each sample.

EXAMPLE 4

The same polyethylene terephthalate (PET) as used in Example 1 and the same ethylene-vinyl alcohol copolymer (EV-1) as used in Example 1 were used for the polyester layer and the gas barrier layer, respectively. A copolyester blend (AD-1) comprising the same polyethylene terephthalate/isophthalate (PET/I) as used in Example 1 and the same polybutylene terephthalate/isophthalate (PBT/I) as used in Example 1 at a weight ratio of 50/50 and a polyester-amide (AD-2) having a melting point of 270° C., which was obtained by subjecting N,N'-bis(p-carboxybenzoyl)hexamethylene-diamine and hexane-1,6-diol to ester exchange reaction in the presence of sodium tetrabutyltitanate as a catalyst and then carrying out polycondensation were used for the adhesive layer. By using these-resin materials and the same sheet-forming device as used in Example 1, two sheets of a symmetric three-resin five-layer structure of polyester layer/adhesive layer/barrier layer/adhesive layer/polyester layer having a total thickness of 2.1 mm (polyester layer/adhesive layer/barrier layer weight ratio of 90/4/6) and a width of 400 mm were prepared.

The sheets were sufficiently cooled so that crystallization was not caused in the PET layers (in each of the obtained sheets, the density of the polyester layers was lower than 1.339 g/cm$^3$ as measured at 20° C.).

The sheets were heated at 80° C. for a short time by an infrared ray heater and were formed into cups having a flange width of 4 mm, an inner mouth diameter of 60 mm, an outer bottom diameter of 40 mm and a height of 90 mm by using a plug assist vacuum/air pressure forming machine. (The cup comprising AD-1 as the adhesive layer is designated as "CAPAD-1" and the cup comprising AD-2 as the adhesive layer is designated as "CAPAD-2"). In each cup, the mean thickness of the barrel was 0.36 mm (the density of the PET layers was 1.35 to 1.365 g/cm³). With respect to each cup, the adhesion strength between the gas barrier layer and the adhesive layer was determined in the same manner as described in Example 1. Rectangular samples having a width of 10 mm and a length of 70 mm were taken out from the barrels of the cups along the height direction. The samples were subjected to 90° bending test at room temperature (25° C.) at a frequency of 50 bendings per minute, and occurrence of the interlaminar peeling was checked.

Separately, the above-mentioned polyethylene terephthalate (PET), ethylene-vinyl alcohol copolymer (EV-1) and adhesives (AD-1 and AD-2) were independently extruded from the respective extruders to obtain four single-layer sheets having a thickness of 0.8 mm (designated as "PET-F", "EV-1F", "AD-1F" and "AD-2F", respectively).

In the same manner as described above, these four sheets were heated at 80° C. by an infrared ray heater and formed into cups having the same shape as that of the above-mentioned multi-layer cups. The forming operation was carried out so that the thickness of the barrel was 0.136 mm. Rectangular samples having a width of 5 mm and a length of 50 mm were taken out from the barrels of the four cups along the height direction (designated as "PET-S", "EV-1S", "AD-1S" and "AD-2S", respectively, according to the kinds of the materials).

The dynamic elasticity moduli of the sheets PET-F, EV-1F, AD-1F and AD-2F at 80° C. and the dynamic elasticity moduli of the rectangular samples PET-S, EV-1S, AD-1S and AD-2S at room temperature (25° C.) were measured at a frequency of 110 Hz by using Vibron Model DDV-II (supplied by Toyo Boldwin K.K.).

The obtained results are shown in Tables 5 and 6.

TABLE 5

| Sample | Dynamic Elasticity Modulus (Kg/cm²) |
| --- | --- |
| PET-F | 560 (at 80° C.) |
| EV-1F | 1000 (at 80° C.) |
| AD-1F | 480 (at 80° C.) |
| AD-2F | 930 (at 80° C.) |
| PET-S | 4860 (at 25° C.) |
| EV-1S | 3160 (at 25° C.) |
| AD-1S | 1800 (at 25° C.) |
| AD-2S | 4200 (at 25° C.) |

TABLE 6

| Cup | Adhesion Strength* (g/10 m width) between Gas Barrier Layer and Adhesive Layer | Results of Bending Test of Rectangular Sample Cut from Barrel of Cup** |
| --- | --- | --- |
| CAPAD-1 | 920–1315 | no peeling (for 60 seconds) |
| CAPAD-2 | 105–1410 | peeling caused in 5 to 15 seconds*** |

Note
*maximum and minimum values of 10 samples.
**bending test was conducted on 50 samples for 60 seconds at longest.
***peeling was caused between gas barrier layer and adhesive layer; minimum and maximum times are shown; when adhesion strength was lower than 1 Kg/10 mm width, peeling was caused in 5 to 9 seconds; when adhesion strength was 1 Kg/10 mm width or higher, peeling was caused in 9 to 15 seconds.

EXAMPLE 5

The same polyethylene terephthalate (PET), ethylene-vinyl alcohol copolymer (EV-1) as used in Example 1 and the same copolyester blend (AD-1) as used in Example 4 were melted and extruded into a symmetric three-resin five-layer sheet having a layer structure of PET/AD-1/EV-1/AD-1/PET (PET/AD-1/EV-1 weight ratio of 90/4/6) by using the same sheet-forming device as used in Example 1. Instead of the sheet cooling take-up device, a plug assist vacuum/air pressure forming machine was connected directly to the sheet-forming device, and the sheet in the melted state (about 270° C.) was formed into a cup having the same shape as that of the cup formed in Example 4 by using the same mold as used in Example 4 (the temperature of the mold was set at about 10° C.). The obtained cup is designated as "CAPAD-1N". The forming conditions were controlled so that the thicknesses of the barrel and bottom of the cup were as close to those of the cup obtained in Example 4 as possible.

The oxygen permeability of each of the so-obtained cup CAPAD-1N and the cup CAPAD-1 obtained in Example 4 was measured under various relative humidities by the gas chromatography. The obtained results are shown in Table 7.

Separately, the ethylene-vinyl alcohol copolymer (EV-1) was extruded in a thickness of 0.8 mm under the same conditions as adopted for formation of the above-mentioned three-resin five-layer sheet (the temperatures of the extruder for EV-1, the adapter of the T-die were the same as those adopted for formation of the above-mentioned three-resin five-layer sheet), and the melted sheet was immediately formed into a cup having the same shape as that of the above-mentioned three-resin five-layer cup. The obtained cup is designated as "EV-1SN". The forming conditions were adjusted so that the thickness of the barrel of the cup was as close to 0.14 mm as possible. The three-dimensional orientation coefficients ($\cos^2\phi x$, $\cos^2\phi y$ and $\cos^2\phi z$) of the central portions of the barrels of the so-obtained cup EV-1SN and the cup EV-1S formed in Example 4 were determined according to the birefringence method. The obtained results are shown in Table 8.

TABLE 7

| | Oxygen Permeability* (cc/m² · day · atm, 25° C.) | |
| --- | --- | --- |
| Cup | 50% RH outside vessel | 90% RH outside vessel |
| CAPAD-1 | 1.8 | 3.1 |
| CAPAD-1N | 3.5 | 10.2 |

Note
*relative humidity inside the vessel was 100%.

TABLE 8

| | Orientation Coefficients* | | |
| --- | --- | --- | --- |
| Sample | $\cos^2\phi x$ | $\cos^2\phi y$ | $\cos^2\phi z$ |
| EV-1S | 0.365 | 0.338 | 0.297 |
| EV-1SN | 0.343 | 0.331 | 0.326 |

Note
*x indicates the height direction of the cup, y indicates the circumferential direction of the barrel and z indicates the thickness direction.

EXAMPLE 6

The same polyethylene terephthalate (PET), ethylene-vinyl alcohol copolymer (EV-1) and copolyester mixture (AD-1) as used in Example 4 were extruded through a multi-layer pipe extruding apparatus comprising the same three extruders as used in Example 1, which were connected to a three-resin five-layer die through feed pipes, and the molten pipe was formed into a pipe opened on both the ends, described hereinafter, by using a pipe-forming apparatus comprising a sizing unit, a cooling tank and a cutter. The formed pipe has a symmetric three-resin five-layer structure of PET-/AD-1/EV-1/AD-1/PET and had an inner diameter of 18.02 mm, an outer diameter of 24.8 mm, a thickness of 3.39 mm (PET/AD-1/EV-1 thickness ratio=100/3/5), a length of 114.6 mm and a weight of 33.5%.

The upper and lower end portions of the pipe were heated by an infrared ray heater while rotating the pipe, and formation of the bottom was carried out by compression forming using a mandrel and a core and formation of the screwed mouth was performed in a necking mold by compressed air, whereby a bottomed preform was obtained.

The preform, except the mouth portion, was heated at about 105° C. by an infrared ray heater and the preform was subjected to biaxial draw-blow forming to obtain a bottle having a full content volume of 1062 ml, an outer barrel diameter of 77.5 mm, a height of 212 mm, an average barrel thickness of 0.335 mm and a minimum barrel thickness of 0.305 mm. The horizontal section of the barrel of the bottle had a circular shape, and the bottom of the bottle had a semi-spherical shape.

The density (20° C.) of the inner and outer PET layers of the pipe opened on both the ends was 1.335 to 1.338 g/cm$^3$, and the density (20° C.) of the inner and outer PET layers of the barrel of the bottle was 1.357 to 1.367 g/cm$^3$. No breakage was found in the ethylene-vinyl alcohol copolymer layer of the bottle. A rectangular sample having a width of 10 and a length of 70 mm was taken out from the barrel of the bottle along the height direction of the bottle. The sample was subjected to the bending test for 1 minute in the same manner as described in Example 4. No interlaminar peeling was observed.

For comparison, the preform, except the mouth portion, was heated at about 80° C. and the preform was subjected to biaxial draw-blow forming to obtain a bottle having the same shape and configuration as described above. The average thickness of the barrel of this bottle was 0.329 mm and the minimum thickness of the barrel was 0.301 mm. A rectangular sample having a width of 10 mm and a length of 70 mm was taken out from the barrel of the bottle, and the sample was subjected to the bending test in the same manner as described above. In about 2 to about 7 seconds, peeling was caused between the ethylene-vinyl alcohol copolymer layer and the adhesive layer. Furthermore, in case of this comparative bottle, breakage and cracking were observed in the ethylene-vinyl alcohol copolymer layer.

We claim:

1. A draw-formed plastic laminate structure obtained by draw-forming a laminate comprising a polyester layer composed essentially of ethylene terephthalate units, a gas barrier layer of an olefin-vinyl alcohol copolymer having a vinyl alcohol content of 40 to 80 mole % and an adhesive layer interposed between said two layers, wherein the polyester layer is molecularly oriented in at least one direction so that the density is at least 1.35 g/cc as measured at 20° C., the olefin-vinyl alcohol copolymer is molecularly oriented in at least one direction to such an extent as recognizable by the birefringence method and the adhesive layer is composed of a copolyester, copolyamide or polyester-amide having a glass transition temperature Tg lower than the crystallization temperature of the polyester layer and a dynamic elasticity modulus lower than those of the polyester layer and the olefin-vinyl alcohol copolymer, or a blend thereof.

2. A structure as set forth in claim 1, wherein the draw-formed structure is a cup-shaped vessel and the density of the thinnest portion of the polyester layer is at least 1.35 g/cm$^3$ as measured at 20° C.

3. A structure as set forth in claim 1, wherein the draw-formed structure is a bottle-shaped vessel and the density of the thinnest portion of the polyester layer is at least 1.35 g/cm$^3$ as measured at 20° C.

4. A process for drawing plastic laminates, which comprises draw-forming a laminate comprising a layer of a polyester composed essentially of ethylene terephthalate units, a gas barrier layer of an olefin-vinyl alcohol copolymer containing 40 to 80 mole% of vinyl alcohol units, and an adhesive layer interposed therebetween, said adhesive layer being composed of a thermoplastic resin having a glass transition temperature Tg lower than the draw-forming temperature t and having a dynamic elasticity modulus lower than that of the polyester layer and the olefin-vinyl alcohol copolymer at the draw-forming temperature t, said adhesive layer being selected from the group consisting of copolyester, copolyamide, polyester-amide, and blends thereof, said draw-forming being carried out under temperature and draw ratio conditions satisfying the requirement represented by the following formula:

$$100\% \leq X \leq \frac{100 - Y}{(0.112 - 0.00825t)}$$

wherein X stands for the area draw ratio (%) defined by the formula of X=100(tho/th−1) in which tho stands for the thickness of the laminate before draw forming and th stands for the thickness of the laminate after draw forming, Y stands for the vinyl alcohol content (mole%) in the olefin-vinyl alcohol copolymer, and t stands for the drawing forming temperature (°C.), wherein the draw forming temperature t is lower than the crystallization temperature of the polyester.

5. The process of claim 4 wherein the draw forming temperature t is higher than 40° C.

6. The process of claim 4 wherein the polyester contains at least 95 mole% of ethylene terephthalate units and has an intrinsic viscosity of at least 0.05 l/g, as measured at 30° C. in a mixed solvent comprising phenol and tetrachloroethane at a weight ratio of 50/50.

7. The process of claim 4 wherein the thickness ratio of the polyester layer and the gas barrier layer is in the range of from 200/1 to 5/1 and the thickness ratio of the gas barrier layer to the adhesive layer is in the range of from 10/1 to ½ and wherein the total thickness of the laminate is in the range of from 50 to 3000 microns.

8. The process of claim 7 wherein the laminate comprises a symmetric five-layer structure in the order of polyester layer, adhesive layer, gas barrier layer, adhesive layer, and polyester layer.

9. The process of claim 8 wherein the five-layer symmetric laminate structure is prepared by simultaneous co-extrusion of said layers.

10. The process of claim 4 wherein the adhesive layer comprises an adhesive selected from the group consisting of ethylene terephthalate/isophthala copolyester, butylene terephthalate/isophthalate copolyester and mixtures of said copolyesters.

* * * * *

UNITED STATES PATENT AND TRADEMARK OFFICE
CERTIFICATE OF CORRECTION

PATENT NO. : 4,675,219

DATED : June 23, 1987

INVENTOR(S) : MUNEKI YAMADA, ET AL.

It is certified that error appears in the above-identified patent and that said Letters Patent is hereby corrected as shown below:

Under "Inventors", delete "Yamada Muneki" and "Sakamoto Akira", insert --Muneki Yamada-- and --Akira Sakamoto--, respectively.

Signed and Sealed this

Tenth Day of November, 1987

Attest:

DONALD J. QUIGG

Attesting Officer

Commissioner of Patents and Trademarks